United States Patent Office.

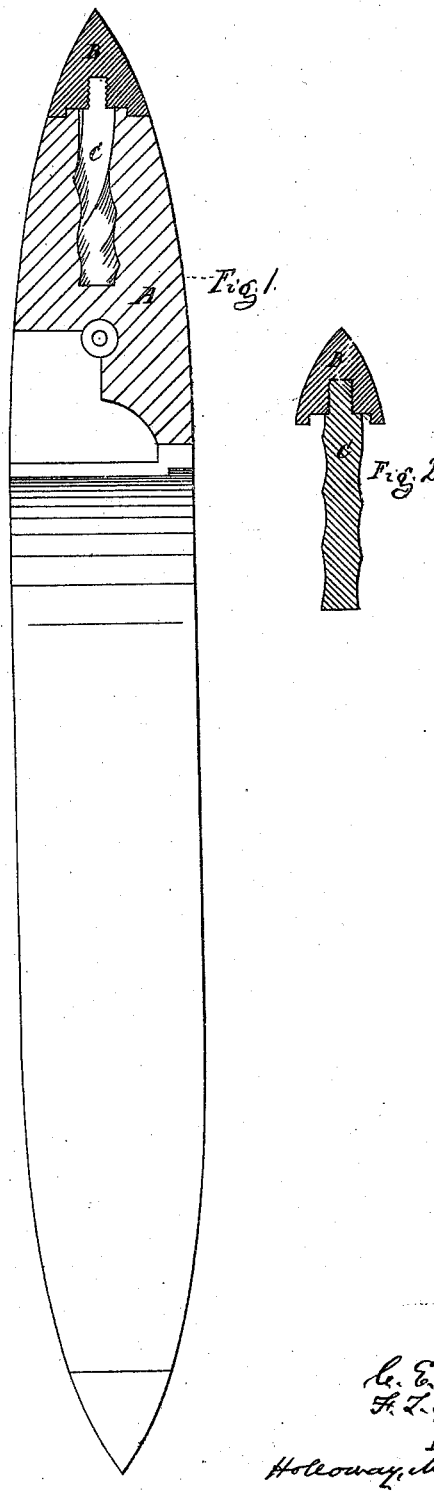

CHARLES E. SMITH AND FRANK T. JAQUES, OF LOWELL, MASSACHUSETTS.

*Letters Patent No. 83,559, dated October 27, 1868.*

IMPROVEMENT IN SHUTTLE FOR LOOMS.

The Schedule referred to in these Letters Patent and making part of the same.

*To all whom it may concern:*

Be it known that we, CHARLES E. SMITH and FRANK T. JAQUES, both of Lowell, in the county of Middlesex, and State of Massachusetts, have invented certain new and useful Improvements in Shuttles for Looms, of which the following is a full, clear, and exact description, reference being had to the accompanying drawings, making part of this specification, in which—

Figure 1 represents, in part, a side elevation of an ordinary shuttle, at one end of which is shown, in section, centrally and longitudinally, the wood portion A, the tip B, and the shank C of the tip.

Figure 2 is a vertical elevation of the tip and shank, showing the method of uniting the same, and of removing said tip, whenever such removal becomes necessary.

Our invention relates to the tip of a shuttle, and has for its object to facilitate the application of the tip to the ends of the shuttle-woods, while the shank is fixed therein, and to furnish a means for producing a cheap and serviceable device, for the above-indicated purpose, which will admit of its being furnished with a new tip, without injury to the other parts of the shuttle, by withdrawing the shank from the wood, thus endangering the splitting of the same, and necessitating a new shank, as well as its tip.

In constructing and applying our invention, the tip B is formed and finished in any of the usual ways, but the shank C is first made square, in its transverse section, and then twisted, as seen in the drawings, the square corners forming a long, shallow-threaded screw, capable of being driven into a hole in the end of the wood of which the shuttle is formed.

The sharp corners of the twisted shank, instead of acting like a wedge, to split the wood, cut their way spirally in the sides of the hole, thus securing themselves therein, without, to any great extent, endangering the splitting of the wood.

Fig. 1 of the drawing shows a shuttle, A, with its tip secured thereto, in accordance with our invention.

Fig. 2 shows that the shank is prepared for the reception of the tip, by having a screw cut upon a reduced portion thereof, at the end which is to enter the tip, and that a corresponding screw is cut within a hole formed in such tip, for the reception of the shank.

The tip B may be made of any suitable metal, such as steel, case-hardened wrought-iron, or cast-iron, and, as is apparent, it may be removed at any time, for the purpose of being repaired, and for the purpose of applying a new one, when the original one becomes worn or broken.

Having thus described our invention,

What we claim, and desire to secure by Letters Patent, is—

The twisted shank C, provided with the removable tip B, constructed substantially as shown and described, in combination with a shuttle.

CHAS. E. SMITH.
FRANK T. JAQUES.

Witnesses:
JOHN E. CRANE,
L. WORCESTER.